(12) United States Patent
Negri et al.

(10) Patent No.: US 11,808,212 B2
(45) Date of Patent: Nov. 7, 2023

(54) DRIVE SHAFT COMPRISING A FUSIBLE SECTION AND METHOD FOR PROTECTING SUCH A DRIVE SHAFT AGAINST AN OVERTORQUE

(71) Applicant: SAFRAN AIRCRAFT ENGINES, Paris (FR)

(72) Inventors: Arnaud Nicolas Negri, Moissy-Cramayel (FR); Julien Fabien Patrick Becoulet, Moissy-Cramayel (FR); Michel Gilbert Roland Brault, Moissy-Cramayel (FR); Romain Guillaume Cuvillier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 218 days.

(21) Appl. No.: 17/431,896

(22) PCT Filed: Feb. 19, 2020

(86) PCT No.: PCT/FR2020/050309
§ 371 (c)(1),
(2) Date: Aug. 18, 2021

(87) PCT Pub. No.: WO2020/169927
PCT Pub. Date: Aug. 27, 2020

(65) Prior Publication Data
US 2022/0145805 A1 May 12, 2022

(30) Foreign Application Priority Data
Feb. 21, 2019 (FR) ...................................... 1901776

(51) Int. Cl.
*F02C 7/36* (2006.01)
*F16C 3/02* (2006.01)
*F16D 9/08* (2006.01)

(52) U.S. Cl.
CPC ................ *F02C 7/36* (2013.01); *F16C 3/023* (2013.01); *F16D 9/08* (2013.01); *F05D 2240/60* (2013.01); *F16C 2326/43* (2013.01)

(58) Field of Classification Search
CPC ........ F02C 7/36; F16C 3/023; F16C 2326/43; F16C 3/02; F16D 9/08; F16D 3/72;
(Continued)

(56) References Cited

U.S. PATENT DOCUMENTS

2010/0111691 A1* 5/2010 Heywood ................. F02C 7/36
415/230

FOREIGN PATENT DOCUMENTS

| EP | 1 199 441 A2 | 4/2002 | |
| EP | 1199441 A2 * | 4/2002 | ........... F01D 21/045 |
| EP | 3 205 840 A1 | 8/2017 | |

OTHER PUBLICATIONS

English translation of Written Opinion dated Apr. 23, 2020, issued in corresponding International Application No. PCT/FR2020/050309, filed Feb. 19, 2020, 4 pages.
(Continued)

*Primary Examiner* — Jacob M Amick
*Assistant Examiner* — Charles J Brauch
(74) *Attorney, Agent, or Firm* — CHRISTENSEN O'CONNOR JOHNSON KINDNESS PLLC

(57) ABSTRACT

A drive shaft of an aircraft turbine engine includes a first portion and a second portion, and connecting means connecting the first and second portions and being configured to transmit a torque from the second portion to the first portion. The connecting means has at least one bellows with a first
(Continued)

section having a diameter greater than the diameters of the first and second portions and second sections flanking the first section. The first section includes at least one fusible section with at least one through-hole and being configured to break when the value of a torque applied to the first portion exceeds a predetermined threshold value.

14 Claims, 4 Drawing Sheets

(58) Field of Classification Search
CPC ........... F16D 2001/103; F05D 2240/60; F05D 2240/61; F05D 2240/62; Y02T 50/60; F01D 5/026; F01D 21/045
See application file for complete search history.

(56) References Cited

OTHER PUBLICATIONS

International Preliminary Report on Patentability dated Aug. 10, 2021, issued in corresponding International Application No. PCT/FR2020/050309, filed Feb. 19, 2020, 6 pages.
International Search Report dated Apr. 23, 2020, issued in corresponding International Application No. PCT/FR2020/050309, filed Feb. 19, 2020, 5 pages.
Written Opinion dated Apr. 23, 2020, issued in corresponding International Application No. PCT/FR2020/050309, filed Feb. 19, 2020, 5 pages.

* cited by examiner

DRIVE SHAFT COMPRISING A FUSIBLE SECTION AND METHOD FOR PROTECTING SUCH A DRIVE SHAFT AGAINST AN OVERTORQUE

FIELD OF THE DISCLOSURE

The present disclosure relates to a drive shaft of a turbomachine, a turbomachine comprising such a drive shaft, and a method for protecting such a drive shaft against an overtorque.

BACKGROUND

The prior art comprises, in particular, the patent applications US-A1-2010/111691, EP-A2-1 199 441 and EP-A1-3 205 840.

In a conventional way, an aircraft turbomachine, for example a turbojet engine, comprises from upstream to downstream in the direction of the gas flow, a fan, one or more compressors arranged in series, for example a low-pressure compressor and a high-pressure compressor, a combustion chamber, one or more turbines, for example a low-pressure turbine and a high-pressure turbine, and a nozzle.

The fan generates a flow of air, a part of which feeds the aforementioned turbomachine members and forms a primary flow in a primary duct, and another part of which flows into a secondary duct that extends around the primary duct and forms a secondary air flow, which generates a major part of the thrust of the turbomachine. A compressor is configured to increase the pressure of the air, which is then supplied to the combustion chamber. In the combustion chamber, air is mixed with a fuel and burned. The combustion gases then pass through a turbine, which rotates a compressor by taking some of a part of the pressure energy from the gases leaving the combustion chamber and converting it into mechanical energy. The nozzle allows exhaust gases to be ejected to also produce a propulsion force for the turbomachine.

In some turbomachine architectures, a reduction gearbox is integrated between the low-pressure turbine and the fan to allow the turbine and the fan to operate at different speeds, with the turbine having a higher rotational speed than the fan.

In particular, the rotor of the low-pressure turbine is coupled to the fan by means of the reduction gearbox, of a shaft that connects the rotor of the low-pressure turbine to the reduction gearbox and of a shaft that connects the reduction gearbox to the fan. The axial position of a shaft is determined in particular by a thrust bearing which, insures the holding of the shaft in the axial direction and prevents it from displacement along its axis, and by its coupling to the reduction gearbox.

It is known that a turbojet engine with a reduction gearbox requires flexible areas on the transmission line from the low-pressure turbine shaft to the reduction gearbox, in order to isolate the vibratory phenomena from the other elements of the turbojet engine. A supple area is usually realized on the input shaft of the reduction gearbox.

In order to achieve this supple area, it was proposed to integrate bellows on the input shaft of the reduction gearbox. More precisely, the input shaft of the reduction gearbox is separated into two portions, which are connected to each other by bellows.

Also proposed in the application FR-A1-2 909 146 is a device for connecting two rotating shafts comprising straight splines which are formed on one of the rotating shafts and which are engaged with complementary straight splines formed on the other of the rotating shafts, and comprising a cylindrical part of greater suppleness on the other of the rotating shafts. The cylindrical part has holes, the number, the arrangement and the dimensions of which are determined in such a way as to calibrate the suppleness of the cylindrical part.

In these turbomachine architectures, it is also necessary to protect the drive shaft from an overtorque due to a sudden seizure in the reduction gearbox, in particular if plain bearings are used for the planet gears of the reduction gearbox. Indeed, in case of sudden seizure of one of these plain bearings, the low-pressure turbine, due to its inertia and its speed of rotation at the moment preceding the seizure, generates a quasi-infinite torque which can lead to the breakage of the transmission line between the low-pressure turbine and the reduction gearbox.

In order to improve the safety within the turbomachine, it is necessary to control this breakage area, as well as the breakage torque of the transmission line.

Thus, it is proposed in the application US-A1-2017/0175753 the integration of a torsionally fusible section in the transmission line downstream of the reduction gearbox. In particular, this request relates to a turbomachine comprising a decoupling means interposed between the reduction gearbox and the low-pressure turbine shaft, which is adapted to decouple the reduction gearbox from the low-pressure turbine shaft in response to the exceeding of a determined resisting torque exerted by the reduction gearbox on the low-pressure turbine shaft.

In the application FR-A-3 015 570, it was also proposed a turbomachine with a set of non-shrouded counter-rotating propellers comprising an inner casing which is integral in terms of rotation with an outer casing arranged around the inner casing, and means of radial support of the outer casing with respect to the inner casing which allow to transmit the radial forces from the inner casing to the outer casing. The radial support means comprise an axial decoupling device arranged between the inner and outer casings, having recesses and allowing to decouple, and thus to dampen, the axial deformations transmitted by the radial support means from the inner casing to the outer casing.

It is also possible to integrate a fusible section on the supple input shaft of the reduction gearbox. However, the length of the input shaft of the reduction gearbox has a direct impact on the overall dimensions of the turbomachine, and as a result, this technical solution increases the overall dimensions and the mass of the turbomachine.

In particular, the disclosure is intended to provide a simple, economical and effective solution to these problems of the prior art.

In particular, the disclosure allows to implement a fusible function on the supple input shaft of the reduction gearbox, without increasing the overall dimensions requirement of the turbomachine.

SUMMARY

To this end, the disclosure relates to a drive shaft of an aircraft turbomachine, comprising:
  a first portion extending longitudinally along an axis and having a first diameter,
  a second portion extending longitudinally along the axis and having a second diameter, and
  connecting means connecting the first and second portions and being configured to transmit a torque from the second portion to the first portion, the connecting means comprise at least one bellows comprising:
- a first section extending longitudinally along the axis and having a diameter greater than the first and second diameters, and
- second sections extending radially to the axis and flanking the first section, the drive shaft being characterized in that the first section comprises at least one fusible section comprising at least one through orifice and being configured to break when the value of a torque applied to the first portion exceeds a predetermined threshold value.

Advantageously, the fusible section is configured to be the only one to break the connecting means in order to separate the first portion from the second portion of the drive shaft when the value of a torque applied to the first portion of the drive shaft exceeds a predetermined threshold value.

In particular, the fusible section is realized by the through orifice in the first section of the connecting means. In effect, the fusible section is configured to break at the level of the through orifice in the event of overtorque applied to the first portion of the drive shaft, so as to protect the other elements of the drive line.

In addition, this is particularly advantageous since oil can accumulate centrifugally at the level of the first section and must therefore be discharged so as not to create oil imbalance or an oil retention area. The through orifice thus also acts as a drainage orifice of the oil.

As a result, the through orifice allows both the drainage of oil that may accumulate at the level of the first section and the fusible function necessary to protect against an overtorque applied to the first portion of the drive shaft.

Since the first section is subjected to a torsional stress, the drilling of the through orifice into the first section involves a local overstressing effect, in particular at the level of the periphery of the through orifice. This phenomenon allows the fuse function to be achieved in the event of overtorque applied to the first portion of the drive shaft.

Furthermore, this technical solution does not increase the axial and radial overall dimensions of the drive shaft, nor the manufacturing costs of the drive shaft.

Thus, the bellows allows for suppleness in the overall dynamic and in the misalignment. According to the disclosure, an overtorque is a torque applied to the first portion whose value exceeds a predetermined threshold value.

The first and second portions may be tubular in shape. The first diameter, i.e., the diameter of the first portion, may be substantially equal to the second diameter, i.e., the diameter of the second portion. Alternatively, the first and second diameters may be different from each other.

The thickness of the first and second portions may be greater than the thickness of the second sections. The thickness of the second sections may be greater than the thickness of the first section.

The first section may be ring-shaped. The diameter of the first section may be at least 1.5 times greater than the first and second diameters.

The first section may comprise a thinned part whose thickness is less than the thickness of the first section. In particular, the thinned part may comprise the fusible section.

The thinned part may extend over at most 80% of the length of the first section.

The fusible section may be ring-shaped. Alternatively, the fusible section may extends over at least one angular sector of the first section.

The fusible section may comprises a plurality of through orifices. The through orifices may be regularly distributed over the fusible section around the axis.

The or each through orifice may be circular or oblong in shape.

The or each through orifice may be defined as:

$$\frac{(R_{OText}^2 - R_{OTint}^2)}{Kt} < (R_{PSext}^2 - R_{PSint}^2) \qquad \text{[Math. 1]}$$

where $R_{OText}$ is the radially outer distance between the through orifice and the axis, $R_{OTint}$ is the radially inner distance between the through orifice and the axis, $Kt$ is a stress concentration factor generated by the through orifice, $R_{PSext}$ is the outer radius between the first section and the axis and $R_{PSint}$ is the inner radius between the first section and the axis.

In particular, a through orifice whose dimensions comply with the above equation is an orifice adapted to perform a fusible function.

The thickness of the first section, the number and the size of the through orifices can be calibrated to optimize the drainage of the oil of the first section and the fusible function.

The connecting means may comprise a plurality of bellows. Each bellows may comprise:
- a first section extending longitudinally along the axis and having a diameter greater than the first and second diameters, and
- second sections extending radially to the axis and flanking the first section.

For at least one of the bellows, referred to as the first bellows, the first section of the bellows may comprise at least one fusible section comprising at least one through orifice and being configured to break when the value of a torque applied to the first portion exceeds a predetermined threshold value. A through orifice adapted to exert the fusible function may also act as a drainage orifice of the oil.

For the other bellows, called second bellows, the first section of the bellows may comprise at least one drainage orifice of the oil. A drainage orifice of the oil is not adapted to exert the fusible function of the through orifices.

In particular, the first section of each bellows may comprise at least one fusible section comprising at least one through orifice and being configured to break when the value of a torque applied to the first portion exceeds a predetermined threshold value.

The first portion may comprise a first end comprising gear teeth and being adapted to be connected to a reduction gearbox and a second end connected to the connecting means.

The second portion may comprise a first end comprising splines and being adapted to be connected to a second drive shaft and a second end connected to the connecting means.

The disclosure also relates to an aircraft turbomachine, comprising:
- a drive shaft according to the disclosure,
- a reduction gearbox connected to the first portion, and
- a second drive shaft connected to the second portion.

Thus, this technical solution allows to ensure the function of decoupling in overtorque to protect the transmission line in the event of sudden seizure in a reduction gearbox connected to the drive shaft, while being compatible with a supple zone at the entrance to the reduction gearbox, and ensuring the drainage of the oil which can accumulate in the supple area.

The disclosure also relates to a method for protecting a drive shaft of a turbomachine according to the disclosure against overtorque, comprising a step of breaking the fusible section when the value of a torque applied to the first portion exceeds a predetermined threshold value.

DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

Figure 1:
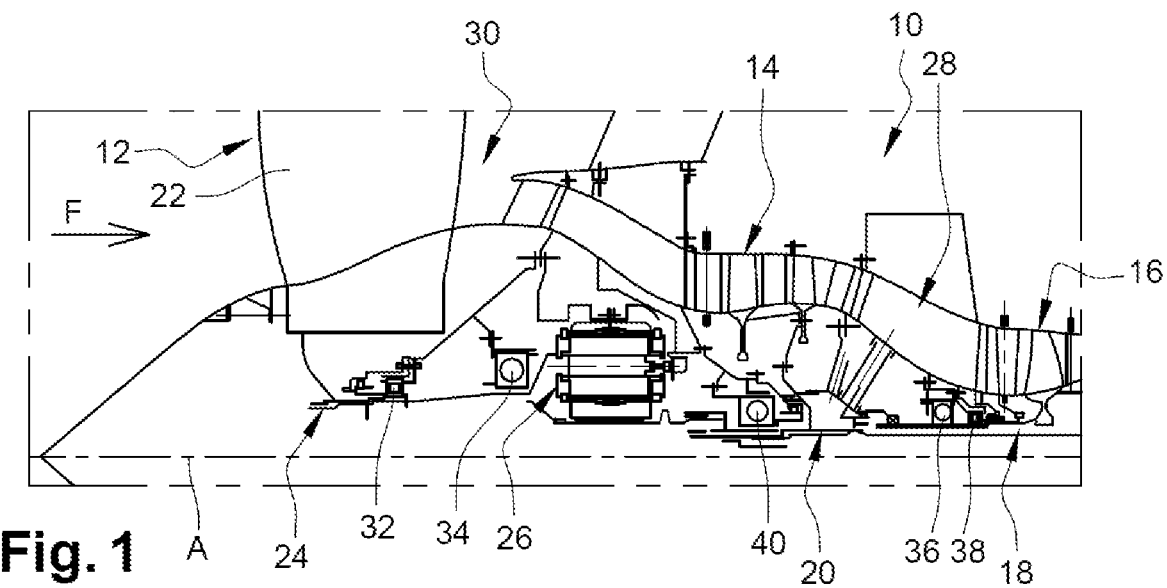
FIG. 1 is a schematic view in semi-axial section of a turbomachine according to the disclosure.

FIG. 1 shows an aircraft turbomachine 10, for example a turbojet engine with dual flow and dual body. The turbomachine 10 comprises, from upstream to downstream according to the flow direction of the flow gases in the turbomachine represented by the arrow F, a fan 12, a low-pressure compressor 14, a high-pressure compressor 16, an annular combustion chamber (not shown), a high-pressure turbine (not shown) and a low-pressure turbine (not shown). The rotors of the high-pressure compressor 16 and the high-pressure turbine are connected by a high-pressure shaft 18 and form a high-pressure body with it. Similarly, the rotors of the low-pressure compressor 14 and of the low-pressure turbine are connected by a low-pressure shaft 20 and form a low-pressure body with it. The high-pressure and low-pressure shafts 18, 20 extend along a longitudinal axis A of the turbomachine 10.

The fan 12 comprises blades 22 which are connected to a fan shaft 24. The shaft 24 of the fan may be rotatably connected to the low-pressure shaft 20 by means of a reduction gearbox 26, for example of the epicyclic gear type. The reduction gearbox 26 is coupled to the low-pressure shaft 20 by means of splines which drive a planetary gear, and to the shaft 24 of the fan which is attached to a planet carrier. Classically, the planetary gear, whose axis of rotation is coincident with that of the turbomachine, drives a series of planet gear pinions or planet gears, which are evenly distributed around the circumference of the reduction gearbox 26. The planet gears also rotate around the axis of the turbomachine, by meshing with internal teeth of a ring gear, which is attached to a stator of the turbomachine. Each of the planet gears rotates freely around a satellite axis connected to the satellite carrier by means of a bearing which may be plain or with rolling elements (ball or roller bearings). The rotation of the planet gears about their planet gear axis, due to the cooperation of their pinions with the teeth of the ring gear, causes the rotation of the planet carrier about the axis of the turbomachine, and consequently that of the shaft 24 of the fan linked to it, at a speed of rotation which is lower than that of the low-pressure shaft 20.

The turbomachine 10 may also comprise a fan casing (not shown) which extends around blades 22 and which defines an air inlet duct for the flow F of the gases. A part of this air enters an internal annular flow duct 28 for a primary flow, referred to as the primary duct, and the other part feeds an external annular flow duct 30 for a secondary flow, referred to as the secondary duct. The primary flow duct 28 passes through the low-pressure compressor 14, the high-pressure compressor 16, the combustion chamber, and the high-pressure and low-pressure turbines. The secondary duct 30 envelops compressor casings (not shown) and turbine casings (not shown) and joins the primary duct 28 at the level of a nozzle (not shown) of the turbomachine 10.

The high-pressure shaft 18, the low-pressure shaft 20 and the fan shaft 24 are centered and guided for rotating about the axis A by bearings, e.g., roller bearings. For example, the shaft 24 of the fan is supported by an upstream bearing 32, herein a roller bearing, and a downstream bearing 34, herein a ball bearing; the high-pressure shaft 18 is supported by an upstream bearing 36, herein a ball bearing, and by a downstream bearing 38, herein a roller bearing; and the low-pressure shaft 20 is supported by a bearing 40, herein a ball bearing.

Figure 2:
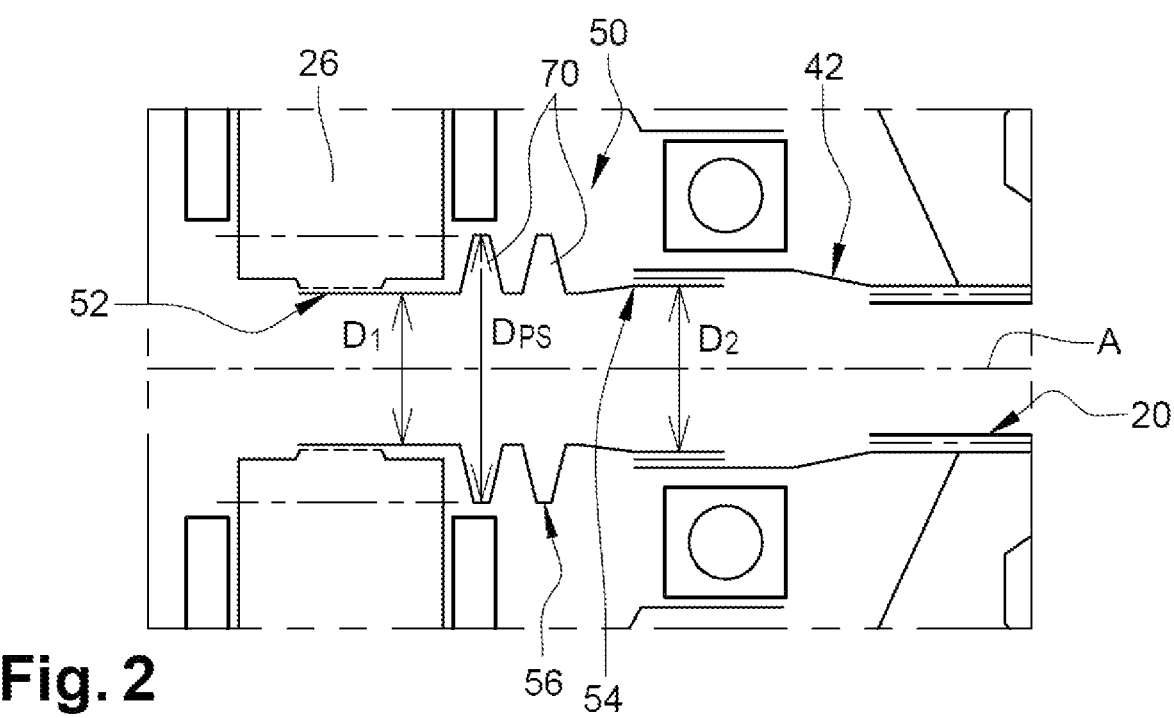
FIG. 2 is a schematic view in axial section of a part of a turbomachine according to the disclosure.

FIG. 2 shows more precisely a part of the turbomachine 10.

The turbomachine comprises a drive shaft 50 connected at one end to the reduction gearbox 26 and at the other end to a second drive shaft 42. The second drive shaft 42 is connected to the low-pressure shaft 20.

The drive shaft 50 extends longitudinally along the axis A. The drive shaft 50 comprises a first portion 52 of tubular shape extending longitudinally along the axis A and having a first diameter D1 and a second portion 54 of tubular shape extending longitudinally along the axis A and having a second diameter D2. Thus, the first and second portions 52, 54 are coaxial. The first diameter D1 can be between 70 mm and 250 mm, for example between 90 mm and 120 mm. The second diameter D2 can be between 70 mm and 200 mm, for example between 90 mm and 120 mm. In particular, the first diameter D1 may be substantially equal to the second diameter D2.

Figure 3:
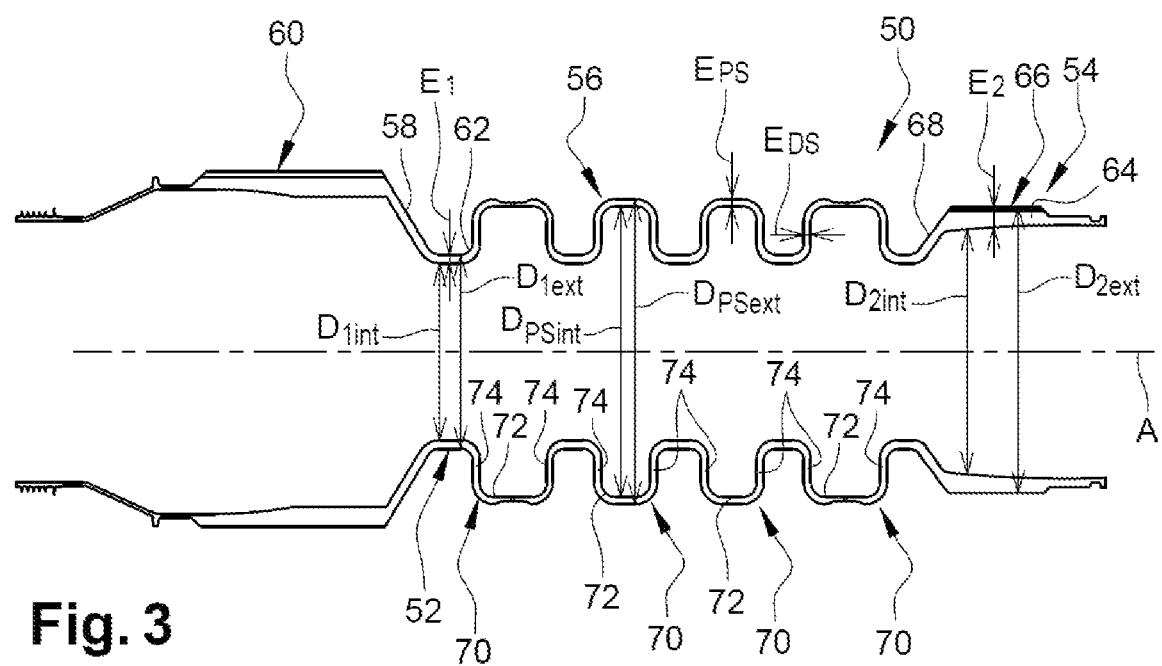
FIG. 3 is a schematic view in axial section of a drive shaft according to the disclosure.
Figure 4A:
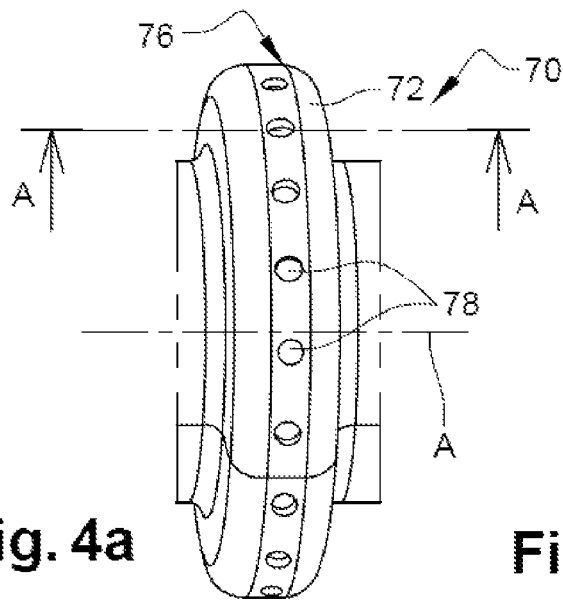
FIGS. 4a, 4b, 4c and 4d are perspective views of a part of a drive shaft according to embodiments of the disclosure.
Figure 4B:
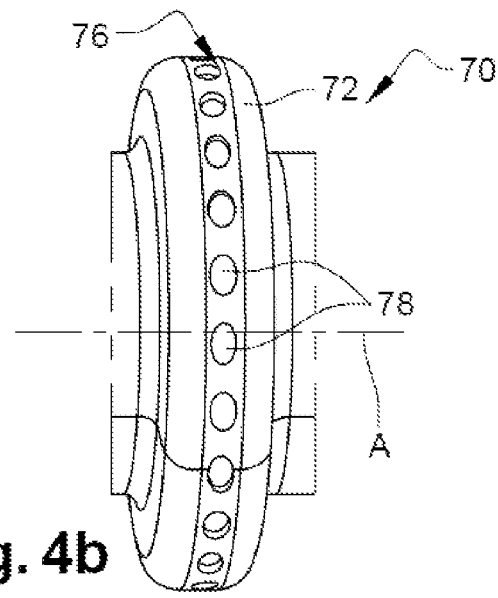
Figure 4C:
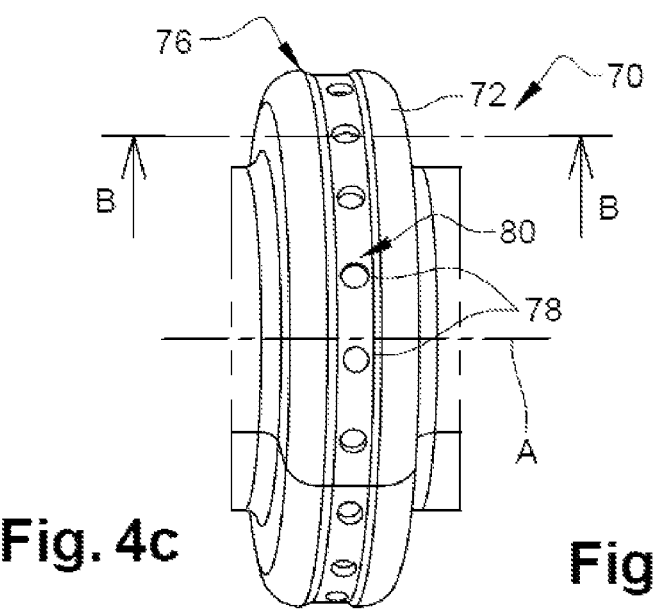
Figure 4D:
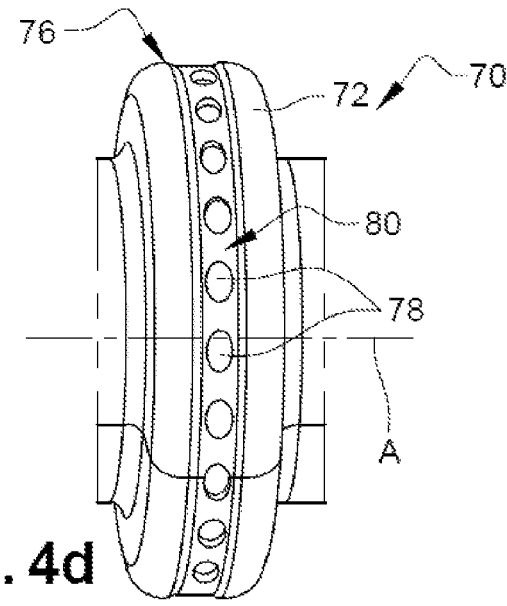

More specifically, FIG. 3 shows a drive shaft 50.

Since the first portion 52 has a tubular shape, the first outer diameter D1ext is defined as the outer diameter of the first portion 52 and the first inner diameter D1int is defined as the inner diameter of the first portion 52. The first diameter D1 corresponds to an average between the first external diameter D1ext and the first internal diameter D1int.

According to the disclosure, the terms "inner" and "outer" are defined with respect to the axis A, "inner" being radially closer to the axis A and "outer" being radially further from the axis A. The thickness E1 of the first portion 52 corresponds to the difference between the first outer diameter D1ext and the first inner diameter D1int. The thickness E1 can be between 2 mm and 6 mm.

The first inner diameter D1int and outer diameter D1ext of the first portion 52 may vary along the axis A. In other words, the thickness E1 of the first portion 52 may vary along the axis A. Similarly, since the second portion 54 is tubular in shape, the second outer diameter D2ext is defined as the outer diameter of the second portion 54 and the second inner diameter D2int is defined as the inner diameter of the second portion 54. The second diameter D2 is an average of the second outer diameter D2ext and the second inner diameter D2int.

The thickness E2 of the second portion 54 corresponds to the difference between the second outer diameter D2ext and the second inner diameter D2int. The thickness E2 can be between 2 mm and 6 mm.

The second inner diameter D2int and outer diameter D2ext of the second portion 54 may vary along the axis A. In other words, the thickness E2 of the second portion 54 may vary along the axis A.

The drive shaft 50 also comprises connecting means 56 that connect the first portion 52 to the second portion 54 and are configured to transmit a torque from the second portion 54 to the first portion 52. In particular, the connecting means 56 are configured to transmit a torsional torque from the second portion 54 to the first portion 52. The torsional torque is transmitted from the low-pressure turbine to the low-pressure shaft 20, then to the drive shaft 50, then to the reduction gearbox 26, then to the shaft 24 of the fan, and finally to the blades 22.

The first portion 52 may comprise a first end 58 adapted to be connected to the reduction gearbox 26. The first end 58 comprises, for example, gear teeth 60. The first portion 52 may comprise a second end 62 that is connected to the connecting means 56.

The second portion 54 may comprise a first end 64 adapted to be connected to a second drive shaft 42. The first end 64 comprises, for example, splines 66. The second portion 54 may comprise a second end 68 that is connected to the connecting means 56.

In particular, the drive shaft 50 is integral, i.e., the first portion 52, the second portion 54 and the connecting means 56 are monolithic.

The connecting means 56 comprises one or a plurality of bellows 70. For example, in FIG. 2, the connecting means 56 comprises two bellows 70, while in FIG. 3, the connecting means 56 comprises four bellows 70.

A bellows 70 comprises a first section 72 extending longitudinally along the axis A. The first section 72 is annular in shape. The first section 72 has a diameter $D_{PS}$ greater than the first diameter D1 and the second diameter D2. The diameter $D_{PS}$ may be at least 1.5 times greater than the first diameter D1 and than the second diameter D2. The $D_{PS}$ diameter can be between 120 mm and 400 mm, for example between 140 mm and 250 mm.

The bellows 70 allow to provide a suppleness for the overall dynamics and the misalignment. A suppleness is defined by a need for overall dynamics, by its installation within the turbomachine, i.e., by its overall dimensions, and by its method of production, i.e., whether the bellows is a single-piece part, or is obtained by forming, by welding, or by internal machining of the shaft.

The outer diameter $D_{PSext}$ is defined as the outer diameter of the first section 72 and the inner diameter $D_{PSint}$ as the inner diameter of the first section 72. The $D_{PS}$ diameter is the average of the external diameter $D_{PSext}$ and the internal diameter $D_{PSint}$.

The inner diameter $D_{PSint}$ may be comprised in a ratio of 1 to 4 with respect to the first inner diameter D1int. For example, the inner diameter $D_{PSint}$ may be comprised between 1 and 2 times the first inner diameter D1int.

The thickness $E_{PS}$ of the first section 72 is the difference between the outer diameter $D_{PSext}$ and the inner diameter $D_{PSint}$. The thickness $E_{PS}$ can be comprised between 2 mm and 6 mm. The thickness $E_{PS}$ of the first section 72 may vary along the A axis.

The thickness E1 of the first portion 52 may be greater than the thickness $E_{PS}$ of the first section 72. The thickness E2 of the second portion 54 may be greater than the thickness $E_{PS}$ of the first section 72.

The thicknesses are a function of the torques that are transmitted by the drive shaft and the need for suppleness in the overall dynamics according to the needs of the turbomachine.

A bellows 70 also comprises second sections 74 extending radially with respect to the axis A and flanking the first section 72. The second sections 74 correspond to shoulders of the first section 72.

The thickness $E_{PS}$ of a second section 74 may be between 2 mm and 6 mm. The thickness $E_{PS}$ of the second section 74 may vary radially with respect to the axis A.

The thickness E1 of the first portion 52 may be greater than the thickness $E_{PS}$ of the second sections 74. For example, the thickness Eos may be between 70% and 80% of the thickness E1.

The thickness E2 of the second portion 54 may be greater than the thickness Eos of the second sections 74. For example, the Eos thickness may be between 70% and 80% of the thickness E2. The thickness Eos of the second sections 74 may be greater than the thickness $E_{PS}$ of the first section 72. For example, the thickness $E_{PS}$ can be between 70% and 80% of the thickness Eos. In other words, the thickness $E_{PS}$ can be between 49% and 64% of the thickness E1 or the thickness E2.

FIGS. 4a, 4b, 4c and 4d show different embodiments of a bellows 70.

The first section 72 comprises at least one fusible section 76. The fusible section 76 is configured to break when the value of a torque applied to the first portion 52 exceeds a predetermined threshold value. In other words, the fusible section 76 is configured to separate the first portion 52 from the second portion 54 when an overtorque is applied to the first portion 52.

The predetermined threshold value can be between 25000 Nm and 100000 Nm.

In particular, the drive shaft 50 is sized to transmit a maximum torque during normal operation and to break when an overtorque in the range of 5% to 15% above the nominal maximum torque is encountered. An overtorque may be caused, for example, by a blockage in the reduction gearbox 26.

The predetermined threshold value depends on the thrust of the turbomachine, the choice of the reduction ratio of the reduction gearbox 26, the speed of rotation of the turbine, and the capacity of the fusible section to ensure the transmission up to the nominal torque, while ensuring instantaneous breakage at the overtorque value (taking into account the size margins).

The fusible section 76 may extend over at least one angular sector of the first section 72. In other words, only a part of the first section 72 may form the fusible section 76. The fusible section 76 may be formed on a plurality of angular sectors of the first section 72, for example evenly distributed, about the axis A.

As shown in FIGS. 4a to 4d, the fusible section 76 may be annular in shape. In other words, the first section 72 may comprise, all around the axis A, the fusible section 76. Thus, the entirety of the first section 72 may form the fusible section 76.

The fusible section 76 comprises one or a plurality of through orifices 78.

The through orifices 78 may be formed over an angular sector of the fusible section 76 about the axis A, or may be evenly distributed over the fusible section 76 with respect to the axis A. The through orifices 78 may be circular or oblong in shape. For example, in FIGS. 4a and 4c, the through orifices 78 are circular in shape, while in FIGS. 4b and 4d, the through orifices 78 are oblong in shape. The oblong shape of the through orifices allows the cross-section between two consecutive orifices to be reduced without increasing the axial overall dimension requirement, thus optimizing the setting of the sectioning torque. Of course, the through orifices 78 may also be polygonal or any other shape.

A through orifices 78 also allows oil that may have accumulated at the level of the first section 72 to be discharged.

Optionally, the first section 72 may comprise a thinned part 80 having a thickness less than the thickness $E_{PS}$ of the first section 72. For example, the thickness $E_{P4}$ of the thinned part 80 may be between 70% and 80% of the thickness $E_{PS}$ of the first section 72. The thickness $E_{P4}$ of the thinned part 80 may be between 1 mm and 5 mm. The thickness $E_{P4}$ of the thinned part 80 may vary along the axis A.

In particular, the thinned part 80 may comprise the fusible section 76. The thinned part 80 may extend no more than 80% of the length of the first section 72, that is, no more than 80% of the dimension of the first section 72 along the axis A. Preferably, the thinned part 80 extends at least 50% of the length of the first section 72. Advantageously, this allows not to weaken the first section 72, while at the same time allowing to have a fusible section 76 on the first section 72 configured to break the drive shaft 50 into two distinct parts when the value of a torque applied to the first portion 52 exceeds a predetermined threshold value.

The thinned part 80 may be formed over at least one angular sector of the fusible section 76, and thus of the first section 72. In other words, only a part of the fusible section 76 may comprise a thinned part 80. The thinned part 80 may be formed over a plurality of angular sectors of the first section 72, for example evenly distributed, about the axis A. The thinned part 80 may be annular. Thus, the fusible section 76 may comprise, all around the axis A, a thinned part 80.

Figure 5A:
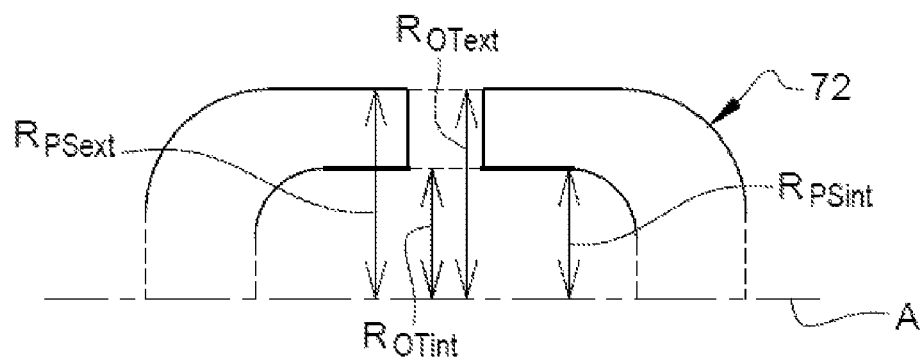
FIG. 5a shows schematically a part of a drive shaft according to the section A-A of FIG. 4a, and FIG. 5b shows schematically a part of a drive shaft according to the section B-B of FIG. 4c.
Figure 5B:
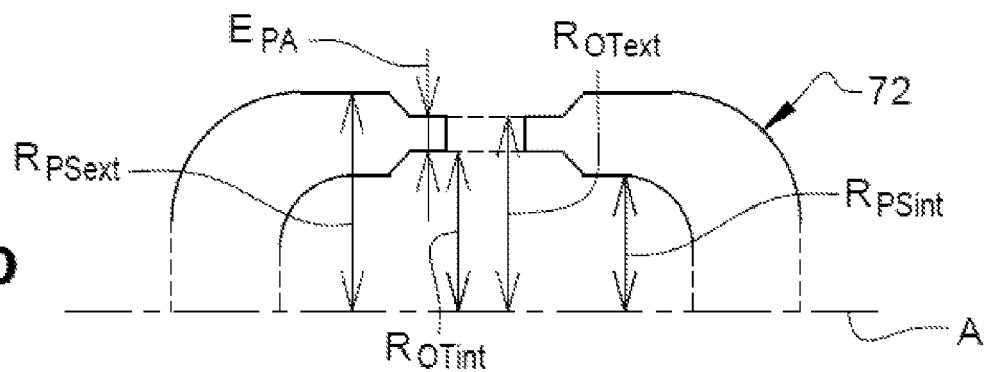

FIGS. 5a and 5b show different embodiments of a first section 72.

In FIG. 5a, the thickness of the first section 72 is constant.

In FIG. 5b, the first section 72 comprises a thinned part 80. Here, the inner diameter of the thinned part 80 is greater than the inner diameter $D_{PSint}$ of the first section 72, and the outer diameter of the thinned part 80 is less than the outer diameter $D_{PSext}$ of the first section 72. In other words, the first section 72 is thinned from the inside and from the outside with respect to the axis A. Of course, the first section 72 may be thinned only from the inside or the outside with respect to the axis A.

A through orifice 78 can be defined according to the following equation:

$$\frac{(R_{OText}^2 - R_{OTint}^2)}{Kt} < (R_{PSext}^2 - R_{PSint}^2) \quad \text{[Math. 2]}$$

where $R_{OText}$ is the radially outer distance between the through orifice 78 and the axis A, Rcyrint is the radially inner distance between the through orifice 78 and the axis A, Kt is a stress concentration factor generated by the through orifice 78, $R_{PSext}$ is the outer radius between the first section 72 and the axis A and $R_{PSint}$ is the inner radius between the first section 72 and the axis A.

By radially outer distance is meant the radial distance of the through orifice 78 at the level of the outside of the fusible section 76 with respect to the axis A, and thus the radial distance of the through orifice 78 farthest from the axis A. Radially inner distance means the radial distance of the through orifice 78 at the level of the inside of the fusible section 76 with respect to the axis A, and thus the radial distance of the through orifice 78 closest to the axis A.

The factor Kt depends on the geometry of the drive shaft, the through orifice 78, and the number of through orifices 78 in the fusible section 76. As a non-limiting example, the factor Kt can be between 1.2 and 5.

A through orifice 78 as defined above may be adapted to perform the fusible function.

In particular, the fusible section 76 is not locally thickened at the level of a through orifice 78 from either the inside or the outside with respect to the axis A. The fusible section 76 is either of constant thickness or comprise a thinned part 80 from the inside and/or from the outside with respect to the axis A. Thus, the thickness of the fusible section 76 is not increased around the through orifice 78. This allows the through orifice 78 to be adapted to perform the fusible function.

When the connecting means comprise a plurality of bellows 70, as shown in particular in FIG. 3, each bellows 70 may comprise a first section 72 and second sections 74.

For at least one of the bellows 70, referred to as the first bellows, the first section 72 of this bellows 70 may comprise a fusible section 76 which comprises one or a plurality of through orifices 78 and which is configured to break when the value of a torque applied to the first portion 52 exceeds a predetermined threshold value. In other words, at least one of the bellows 70 may comprise a fusible section 76 on its first section 72, and thus at least one through orifice 78 adapted to exert a fusible function. In particular, only one of the bellows 70 may comprise a fusible section 76 having at least one through orifice 78 adapted to exert a fusible function on its first section 72. A through orifice 78 in the first bellows also acts as drainage of the accumulated oil.

For the other bellows, known as second bellows, the first section 72 of these bellows does not comprise a fusible section 76, nor a through orifice 78 adapted to exert a fusible function. The second bellows may comprise one or a plurality of drainage orifices of the oil, which are configured to drain the oil accumulated at the level of the first section of the bellows. These drainage holes are not adapted to exert the fusible function of the through orifices 78. Alternatively, the first section 72 of each bellows 70 of the plurality of bellows, i.e., the first and second bellows, may comprise a fusible section 76 comprising at least one through orifice 78 and being configured to break when an overtorque is applied to the first portion 52. In other words, all the bellows comprise orifices adapted to exert the fusible function, these orifices also allowing the drainage of the oil accumulated at the level of the first section of each bellows.

The disclosure also relates to a method for protecting against an overtorque a drive shaft 50 as previously described.

The method comprises a step of breaking the fusible section 76 when the value of a torque applied to the first portion 52 exceeds a predetermined threshold value. In other words, the method comprises a step of breaking the drive shaft 50 into two separate parts, the first portion 52 and the second portion 54, when an overtorque is applied to the first portion 52 of the drive shaft 50.

This advantageously allows to protect the transmission line against a high torque applied to one of the elements of the transmission line.

The invention claimed is:

1. A drive shaft of an aircraft turbomachine, comprising:
a first portion extending longitudinally along an axis and having a first diameter,
a second portion extending longitudinally along said axis and having a second diameter, and
connecting means connecting said first and second portions and being configured to transmit a torque from said second portion to said first portion, said connecting means comprise at least one bellows comprising:
a first section extending longitudinally along said axis and having a diameter greater than said first and second diameters, and
second sections extending radially to said axis and flanking said first section,
wherein said first section comprises at least one fusible section comprising at least one through orifice and being configured to break when the value of a torque applied to said first portion exceeds a predetermined threshold value.

2. The drive shaft according to claim 1, wherein a thickness of the first and second portions is greater than a thickness of the second sections and/or the thickness of the second sections is greater than a thickness of the first section.

3. The drive shaft according to claim 1, wherein said first section comprises a thinned part having a thickness less than the thickness of the first section, said thinned part comprising said fusible section.

4. The drive shaft according to claim 3, wherein the thinned part extends over at most 80% of the length of the first section.

5. The drive shaft according to claim 1, wherein said fusible section comprises a plurality of through orifices regularly distributed around said axis.

6. The drive shaft according to claim 1, wherein each through orifice is circular or oblong in shape.

7. The drive shaft according to claim 1, wherein each through orifice is defined according to:

$$\frac{(R^2_{OText} - R^2_{OTint})}{Kt} < (R^2_{PSext} - R^2_{PSint})$$

where $R_{OText}$ is a radially outer distance between said through orifice and said axis, $R_{OTint}$ is a radially inner distance between said through orifice and said axis, Kt is a stress concentration factor generated by said through orifice, $R_{PSext}$ is an outer radius between said first section and said axis and $R_{PSint}$ is an inner radius between said first section and said axis.

8. The drive shaft according to claim 1, wherein said connecting means comprise a plurality of bellows, each bellows comprising:
a first section extending longitudinally along said axis and having a diameter greater than said first and second diameters, and
second sections extending radially to said axis and flanking said first section, and for at least one of the bellows, the first section of said bellows comprises at least one fusible section comprising at least one through orifice and being configured to break when the value of a torque applied to said first portion exceeds a predetermined threshold value.

9. The drive shaft according to claim 1, wherein said first portion comprises a first end comprising gear teeth and being adapted to be connected to a reduction gearbox and a second end connected to said connecting means and said second portion comprises a first end comprising splines and being adapted to be connected to a second drive shaft and a second end connected to said connecting means.

10. The drive shaft according to claim 1, wherein the first diameter is equal to the second diameter.

11. The drive shaft according to claim 1, wherein the first diameter is different from the second diameter.

12. The drive shaft according claim 1, wherein the diameter of the first section is at least 1.5 times greater than the first and second diameters.

13. An aircraft turbomachine, comprising:
a drive shaft according to claim 1,
a reduction gearbox connected to said first portion, and
a second drive shaft connected to said second portion.

14. A method for protecting a drive shaft of a turbomachine according to one of claim 1 against overtorque, comprising a step of breaking the fusible section when the value of a torque applied to the first portion exceeds a predetermined threshold value.

* * * * *